UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

PROCESS OF PRODUCING PHENOLIC CONDENSATION PRODUCTS.

1,310,088.     Specification of Letters Patent.     Patented July 15, 1919.

No Drawing.     Application filed September 16, 1918. Serial No. 254,371.

*To all whom it may concern:*

Be it known that we, LAWRENCE V. REDMAN, a citizen of Canada, who has taken out his first papers for citizenship in the United States, a resident of Evanston, Cook county, Illinois, and ARCHIE J. WEITH and FRANK P. BROCK, citizens of the United States, residing at Chicago, in the county of Cook and State of Illinois, have invented a new and useful Improvement in Processes of Producing Phenolic Condensation Products, of which the following is a specification.

This invention relates particularly to the production of a phenolic condensation product adapted to be molded, sawed, machined, sandpapered and buffed, and especially to transparent or semi-transparent condensation products of this character, such as are employed in the manufacture of pipes, pipe-stems, cigar-holders, cigarette-holders, etc.

The primary object is to provide an improved process which will enable a phenolic condensation product possessing the finest qualities, such as a fine color, great tenacity, capability of being machined and worked with facility, sandpapered and buffed, to be produced with great uniformity and certainty.

According to the preferred method, we first obtain a fusible condensation product of a phenolic body and a methylene body, which contains a large percentage of free phenol; and then mix with this fusible phenolic condensation product a methylene substance in sufficient quantity to convert the fusible product to a substantially insoluble condition. The step of producing the insoluble product from the soluble product is preferably performed, after an initial condensation process, by heat treatment at a temperature below 100° C. extending through a prolonged period and until the material becomes substantially insoluble and (if water is originally present) anhydrous.

A hard insoluble product produced in this manner is of a commercial character, and may be employed, for instance, in the manufacture of pipes, pipe-stems, cigar-holders, cigarette-holders, etc.

For such purposes, the material is commonly transparent, or semi-transparent, but may have a reddish or orange tinge, which detracts from the appearance. Moreover, such a product is lacking in the finest qualities.

We have discovered that it is possible to produce an improved transparent phenol condensation product by first producing a hard, resistant and substantially insoluble and anhydrous product by prolonged heat treatment at a temperature, say below 100° C. and preferably exceeding 50° C. and then subjecting such product to further heat treatment at a higher temperature, which preferably considerably exceeds 100° C.; and desirably is about 125° C. this treatment being capable of being completed within a relatively short period of time, say a period of one or two weeks.

We may produce the initial insoluble and substantially anhydrous transparent material in various ways, as, for example, in the manner described in United States Letters Patent No. 1,188,014, granted June 20, 1916, or in the manner described in our co-pending applications No. 254,368, No. 254,369, No. 254,370, filed of even date herewith.

As pointed out in the patent referred to above, we may produce a fusible, soluble, anhydrous phenolic condensation product containing a relatively large proportion of free phenol by causing a reaction between hexamethylenetetramin and phenol, taken, for example, in the proportion of 1 mol of hexamethylenetetramin to 11 mols of phenol; and having obtained a fusible, soluble product in this manner, may convert the same to a hard, resistant and substantially insoluble and anhydrous product by mixing with the fusible product a methylene substance in sufficient quantity to give a final product corresponding with the union of approximately 1 methylene group with each phenol group, such mixture being subjected to the action of heat at a moderate temperature until the reaction has been completed and a hard, resistant, insoluble and anhydrous product results.

The use of a suitable phenolic body and hexamethylenetetramin, in accordance with the process set forth in the above-mentioned patent, will produce a substantially anhydrous and insoluble product, which has a yellow or amber-like color, but which may have also a reddish or orange tinge therein.

It is pointed out in Patent No. 1,188,014 that the final product corresponds with the union of 1 mol of hexamethylenetetramin to 6 mols of phenol, which is another way of saying that there is one phenol group to each methylene group. It is desirable, however, that there should be a slight excess of phenol, in order that it may be certain that there shall be produced a material which can be readily machined and worked. Accordingly, it is desirable to use such proportions as will result in a product containing 6 methylene groups to 6⅓ phenol groups, or this may run as high as 7½ phenol groups to 6 methylene groups.

In the co-pending applications hereinabove referred to, we have described modifications of the present process in which the initial hard, resistant and substantially insoluble and anhydrous product is produced by condensing a solution of formaldehyde with phenol and converting the product to the hard and substantially insoluble and anhydrous condition by prolonged application of heat at a temperature below 100° C. and preferably exceeding 50° C. An example of producing the initial hard product from phenol and formaldehyde may be stated as follows:

Boil together at atmospheric pressure 3 parts of a 40 per cent. solution of formaldehyde and 5 parts of phenol, until there results a lower layer comprising a viscous, creamy, gummy mass and an upper or supernatant aqueous layer, the boiling being continued until the aqueous layer is substantially free from formaldehyde; discard the water and stir into or mix with the gummy mass 2 parts of the formaldehyde solution, preferably allowing the mass to cool to 60° or 70° C. during the stirring operation; concentrate the mass by heating to a temperature of about 115° C., rendering the mass as stiff as possible but stopping short of the gelatinous state and while the material is still in condition to be poured; preferably add a further small amount of formaldehyde, say three to five per cent. of the mass, to replace any loss of formaldehyde which may have occurred during concentration; pour the mass into molds and allow it to "set" at a temperature below 100° C.; then remove from the molds and subject to heat treatment for a prolonged period, or until the material becomes hard, resistant, and substantially insoluble and anhydrous, such prolonged heat treatment usually requiring a period of from several weeks to several months, depending upon the thickness, degree of heat employed, etc. This material when thoroughly hard, may be machined, sawed, etc.

In accordance with our present discovery, we subject the hard and substantially insoluble and anhydrous condensation product, obtained by any of the methods indicated above, to a further heat treatment at a higher temperature for a comparatively short period of time. The temperature employed in this treatment is preferably about 125° C., and should be above 100° C. it may range to 150° C. or higher, but it is unnecessary to exceed 150° C. This treatment apparently results in some colloidal change and eliminates the reddish or orange tint which occurs very often in this class of product, especially where the phenolic body employed is not a pure phenol. Also, this heat treatment results in improving the other qualities of the product, increasing the tensile strength, rendering the material more easily machined, and enabling it to be sandpapered and buffed with much greater facility. In general, the qualities of the material are greatly improved and a finer tempered material results.

The color obtained by this method is a clear, light amber, of fine lemon color. If desired, the color may be modified, without sacrificing the pleasing effect. For instance, one may introduce before the material is poured into the molds, auramin, to produce a deep amber color; methyl violet, to produce amethyst; acetyl red, to produce "dregs of wine," etc. These coloring materials may be used in small quantities and need not exceed ½ of one per cent. of the mass. Oils and waxes may be employed to produce opaque materials; and ground mica or fish-scales may be employed to produce a shimmering effect.

The reactions and heat treatments may be performed at atmospheric pressure, or under reduced pressure, *in vacuo*, or under increased pressure, as desired.

The foregoing detailed description has been given for clearness of understanding only, and no unnecessary limitation should be understood therefrom, but the appended claims should be construed as broadly as permissible in view of the prior art.

What we regard as new and desire to secure by Letters Patent is—

1. The process of producing a phenolic condensation product, which comprises: producing a hard and substantially insoluble and anhydrous condensation product by causing reaction between materials comprising a phenolic body and an active methylene body and hardening the same by prolonged heat treatment at a temperature below 100° C. until there is obtained a hard and substantially insoluble, anhydrous product throughout; and then subjecting the preparatorily formed product to heat treatment at a temperature exceeding 100° C. for a relatively short period.

2. The process of producing a phenolic condensation product, which comprises: producing a hard and substantially insoluble and anhydrous condensation product by causing reaction between substances comprising a phenolic body and an active methylene body taken in proportions affording a large excess of phenol groups over the methylene groups, condensing the soluble condensation product thereby obtained with an additional amount of an active methylene body, and hardening the product thus obtained by prolonged heat treatment at a temperature below 100° C. until there is obtained a hard and substantially insoluble and anhydrous product throughout; and then subjecting the preparatorily formed condensation product to further heat treatment at a temperature exceeding 100° C. for a comparatively short period of time to obtain a product of finer color and improved qualities.

3. The process of producing a phenolic condensation product, which comprises: first producing a hard and substantially insoluble and anhydrous condensation product by causing reaction between a phenolic body and an active methylene body and obtaining a condensation product containing a large excess of free phenol, then mixing with the soluble product thus obtained a sufficient amount of a methylene substance to produce a final product corresponding with the union of slightly less than 1 methylene group for each phenolic group, and subjecting the mixture to a heating operation to cause the reaction and to prolonged heat treatment at a temperature below 100° C. until the product becomes hard and substantially insoluble and anhydrous throughout; and finally subjecting the preparatorily formed insoluble, anhydrous condensation product to heat treatment at a temperature considerably in excess of 100° C. for a relatively short period of time.

4. The process of producing a phenolic condensation product, which comprises: first producing a hard and substantially insoluble and anhydrous condensation product by anhydrous reaction between a phenolic body and a methylene-amin substance, taken in proportions to afford a large excess of phenol, thus producing a fusible condensation product containing a high percentage of free phenol, then mixing with the fusible product a sufficient amount of a methylene substance to convert the mass to a hard insoluble condition, and heating the mass to cause reaction, and hardening the mass by prolonged heat treatment at a temperature below 100° C. until the mass is hard and substantially insoluble and anhydrous throughout; and finally subjecting the insoluble condensation product to heat treatment at a temperature exceeding 100° C. for a relatively short period of time to improve the color and working qualities of the product.

5. The process of producing a phenolic condensation product, which comprises: first preparing a hard and substantially insoluble and anhydrous condensation product by causing anhydrous reaction between a phenolic body and hexamethylenetetramin, taken in proportions to afford a large excess of phenol, and then mixing with the fusible condensation product a sufficient amount of a methylene substance to convert the product to a hard and substantially insoluble product containing a slight excess of phenol, and heating the mass to produce the reaction, and hardening the mass by prolonged heat treatment at a temperature below 100° C. until the product is substantially insoluble and anhydrous throughout; and finally subjecting the insoluble product to heat treatment at a temperature considerably in excess of 100° C. for a relatively short period of time to improve the color and working qualities of the product.

LAWRENCE V. REDMAN.
ARCHIE J. WEITH.
FRANK P. BROCK.